(12) United States Patent
Cintula

(10) Patent No.: US 12,442,419 B2
(45) Date of Patent: Oct. 14, 2025

(54) GEAR MODULE WITH A SECURING RING

(71) Applicant: Schaeffler Technologies AG & Co. KG, Herzogenaurach (DE)

(72) Inventor: Marián Cintula, Myjava (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/568,339

(22) PCT Filed: Jun. 8, 2022

(86) PCT No.: PCT/DE2022/100430
§ 371 (c)(1),
(2) Date: Dec. 8, 2023

(87) PCT Pub. No.: WO2022/268255
PCT Pub. Date: Dec. 29, 2022

(65) Prior Publication Data
US 2024/0280142 A1    Aug. 22, 2024

(30) Foreign Application Priority Data

Jun. 22, 2021  (DE) .......................... 102021116051.0

(51) Int. Cl.
*F16C 35/063* (2006.01)
*F16C 19/36* (2006.01)
*F16H 1/24* (2006.01)
*F16H 57/021* (2012.01)

(52) U.S. Cl.
CPC .......... *F16C 35/063* (2013.01); *F16C 19/364* (2013.01); *F16H 1/24* (2013.01); *F16H 57/021* (2013.01); *F16C 2226/74* (2013.01); *F16C 2361/61* (2013.01)

(58) Field of Classification Search
CPC .. F16C 35/063; F16C 19/364; F16C 2226/74; F16C 2361/61; F16H 1/24; F16H 57/021
See application file for complete search history.

(56) References Cited

U.S. PATENT DOCUMENTS 3,007,753 A * 11/1961 Potter ................... F16C 35/063
384/538
8,348,513 B2   1/2013 Rusteberg et al.

FOREIGN PATENT DOCUMENTS

| DE | 8202674 U1 | 5/1982 |
|---|---|---|
| DE | 102007030982 A1 | 1/2009 |
| DE | 102009005315 A1 | 7/2010 |
| DE | 19955390 B4 | 12/2011 |

(Continued)

*Primary Examiner* — Terence Boes
(74) *Attorney, Agent, or Firm* — Volpe Koenig

(57) ABSTRACT

The disclosure relates to a gear module for a transmission, having at least one gear which is arranged on a rotatably mounted shaft. For rotatable mounting, the shaft is provided with at least one rolling bearing which is plugged onto an end-face bearing seat section, the rolling bearing being fixed by a securing ring arranged in a circumferential groove of the shaft near the end face in order to axially secure the installation position. The, securing ring has an installation edge oriented radially inwards starting from an axial central section, for engaging into the circumferential groove of the shaft and with a deformation edge, which extends radially outwards in the installed state, for engaging behind the rolling bearing plugged onto the end-face bearing seat section.

16 Claims, 3 Drawing Sheets

(56) References Cited

FOREIGN PATENT DOCUMENTS

| | | | |
|---|---|---|---|
| GB | 2118640 A | * 11/1983 | ............ F16C 13/006 |
| JP | S5846214 A | 3/1983 | |
| JP | 2007198425 A | 8/2007 | |
| JP | 2012219888 A | 11/2012 | |
| KR | 20090050715 A | 5/2009 | |
| WO | 2002093038 A1 | 11/2002 | |

* cited by examiner

GEAR MODULE WITH A SECURING RING

CROSS-REFERENCE TO RELATED APPLICATIONS

This application is the U.S. National Phase of PCT Appln. No. PCT/DE2022/100430, filed Jun. 8, 2022, which claims priority to German Patent Application No. 10 2021 116 051.0, filed Jun. 22, 2021, the entire disclosures of which are incorporated by reference herein.

TECHNICAL FIELD

The present disclosure relates to a gear module for a transmission having at least one gear arranged on a rotatably mounted shaft, wherein for rotatable mounting of the shaft, said shaft is provided with at least one rolling bearing plugged onto an end-face bearing seat section and secured with a securing ring. In addition, the disclosure relates to a specific method for installing the rolling bearing.

The field of application of the disclosure extends primarily to transmission arrangements which employ a gear module consisting of a shaft and at least one gear arranged thereon. This can be, for example, a spur gear stage of a transmission, which can also be designed as an intermediate shaft module. Usually, a gear module of the type of interest here has rolling bearings on both sides, wherein use is usually made of standardized rolling bearings which are plugged onto bearing seat sections of the respective shaft end. The solution according to the disclosure is dedicated to axially securing the installation of the rolling bearing, and optionally an adjacent gear, using a specific securing ring.

BACKGROUND

Prior Art

DE 199 55 390 A1 discloses a profiled snap ring for securing the relative position of two rolling bearings arranged to be axially adjacent to one another via an aligned bore formed by the bearing inner rings. These are each provided with mutually adjacent inner grooves for receiving the profiled snap ring. The snap ring has a corresponding U-profile and is slotted so that it can be brought into the desired position via the bore using an installation tool to reduce the diameter. To secure the installation position of a rolling bearing, however, the structural requirement of mounting a snap ring via a bore is not always met.

In the generic case of DE 10 2007 030 982 A1, a rolling bearing plugged onto a shaft end in the region of a bearing seat section is axially secured using at least one snap ring as a securing ring, which is releasably inserted into a circumferential groove of the shaft near the end face, i.e., in an outer groove there. On the opposite side, the rolling bearing comes into contact with a shaft shoulder as an axial stop. The end of the shaft protrudes beyond the face of the rolling bearing for the installation of the securing ring, which requires additional axial space.

SUMMARY

It is the object of the present disclosure to further improve a generic gear module with snap ring securing of a rolling bearing in such a way that the rolling bearing can be easily and securely fixed by means of a securing ring in the region of the shaft end without requiring additional axial installation space.

This object is achieved through a gear module having one or more of the features disclosed herein. Reference is made to an installation method in this regard having one or more of the features disclosed herein. Advantageous developments according to the disclosure are described below and in the claims.

The disclosure includes the technical teaching that a securing ring for axially securing the installation position of a rolling bearing or the like on a shaft has an installation edge that is oriented radially inwards, starting from an axial central section, on one side for engaging in the circumferential groove of the shaft, and on the other side is provided with a deformation edge that extends radially outwards in the installed state for engaging behind the rolling bearing plugged thereonto.

The advantage of the solution according to the disclosure lies in particular in the fact that the approximately Z-shaped profiled securing ring can be accommodated at least for the most part in the bore region of the bearing inner ring, so that no protruding shaft end is required for the arrangement of the securing ring. This results in a saving of axial installation space for the space-saving accommodation of the gear module according to the disclosure in a transmission. With the rolling bearing plugged thereonto, a gear arranged to be adjacent to the bearing seat section on a splined section or the like can optionally also be secured at the same time. In contrast to the prior art discussed at the outset, however, the securing ring according to the disclosure is not to be classified as a detachable connecting means, but rather as a fixed connecting means, due to its deformation edge engaging behind the component.

This specific securing ring is installed as part of the installation of a rolling bearing on a shaft of a gear module according to the following installation steps.

- inserting the installation edge of the securing ring, which extends radially inwards, into the end-face outer groove of the shaft,
- plugging the rolling bearing onto the bearing seat section of the shaft with the securing ring installed, and
- deforming the securing ring to form the radially outwardly extending deformation edge for engaging behind the mounted rolling bearing. This is preferably done with the aid of a bending die as a tool.

The specific feature of this installation method is that the securing ring is first mounted on the shaft before the rolling bearing is plugged onto the bearing seat section, wherein the solid component connection is only produced by a final edge deformation of the securing ring.

According to an optional upstream installation step, it is proposed that before the securing ring is inserted into the circumferential groove of the shaft in the region of the bearing seat section, or at least before installing the rolling bearing, a plugging of the preferably helically toothed gear across the bearing seat section onto a splined section of the shaft up to a shaft shoulder as an axial stop is carried out. With this arrangement, the gear is also secured in the desired axial position by the securing ring with the rolling bearing.

The circumferential groove of the shaft near the end face is preferably positioned in such a way that the securing ring, in the installed state, is accommodated at least for the most part within the bore of the rolling bearing. A corresponding variation in the axial position of the circumferential groove can be made over the length of the axial central section of the securing ring.

According to a further improvement measure, it is proposed that the deformation edge of the securing ring is accommodated in the mounted state in the region of an inner radial edge recess of the rolling bearing. As a result, the securing ring can be accommodated completely in the bore region of the rolling bearing. As an alternative thereto, however, it is also possible to leave the corresponding bearing inner ring of the rolling bearing unmachined if a slight axial overhang caused by the deformation edge is acceptable.

The securing ring according to the disclosure, which in principle has two legs in its final state, is preferably made from a formed sheet metal strip material and is provided with a separating slot for elastic diameter adjustment, which gives the securing ring according to the disclosure a snap ring functionality to facilitate installation.

According to a further improvement measure, it is proposed that the deformation edge and/or installation edge of the securing ring be at an angle $\alpha \leq 90°$ to the axial central section. As a result, the securing ring is given elasticity in the axial direction so that it can exert an axial contact pressure on the end face of the bearing, and optionally on the adjacent gear or another adjacent component plugged onto the shaft. This ensures an installation which is free of axial play.

As an alternative to a continuous deformation edge, this can also consist of individual forming tabs which are arranged to be spaced apart from one another in the circumferential direction and which form a deformation edge which is interrupted in this respect. This can be bent with a relatively low forming force, which can also be carried out manually using a bending punch as a tool.

According to a preferred embodiment of the disclosure, the gear module preferably serves to form a transmission ratio step, which can in particular represent an intermediate shaft module of a gear and is provided with a first gear, wherein a second gear is plugged onto a splined section adjacent to the bearing seat section. The plugged-on second gear is preferably provided with helical gearing, the course of which presses the gear during operation against a shaft shoulder or another attached component as an axial stop. As a result, the axial force component resulting from the helical gearing does not bear on the securing ring.

As a further measure to improve this arrangement, it is proposed that between the second gear mounted on the splined section and the rolling bearing mounted on the adjacent bearing seat section of the shaft, a relief groove be introduced with respect to the shaft, so that in this configuration it is not the shaft shoulder but the second gear that forms the axial stop for the rolling bearing. As a result, an axial play-free installation is also achieved for the plugged-on gear via the securing ring on the shaft end-face, with the rolling bearing being arranged therebetween.

In the preferred embodiment of the gear module, the first gear is provided with a smaller diameter than that of the second gear, so that the first gear can be designed in one piece with the shaft, i.e., not as an additional component requiring installation. The flank side of the first gear facing the second gear preferably forms an axial stop for the second gear that is plugged onto the splined section of the shaft, which makes a further contribution to minimizing the axial installation space.

BRIEF DESCRIPTION OF THE DRAWINGS

Further measures according to the disclosure are illustrated below together with the description of preferred exemplary embodiments using the figures. In the figures.

DETAILED DESCRIPTION

Figure 1:
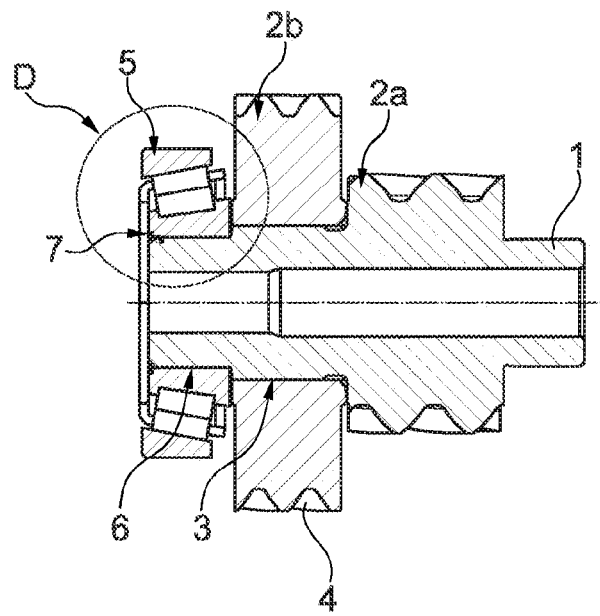
FIG. 1 shows a longitudinal section through a partially installed gear module for a transmission.

According to FIG. 1, a gear module for a transmission (not shown) essentially consists of a smaller-diameter gear 2a that is directly molded onto a rotatable shaft 1 designed as a hollow shaft, which is combined with a second gear 2b adjacent thereto on a splined section 3 of the shaft 1. Both the first smaller-diameter gear 2a and the second larger-diameter gear 2b are provided with helical gearing 4.

The shaft 1 is rotatably mounted on both sides, wherein only one rolling bearing 5 is shown here. The rolling bearing 5 is plugged onto an end-face bearing seat section 6 of the shaft 1. The axial target position of both the second gear 2b and the rolling bearing 5 is secured by means of a securing ring 7.

Figure 1A:
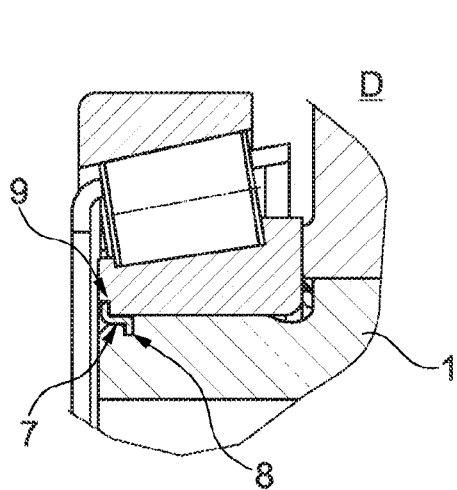
FIG. 1A shows a detail D in the region of the mounted securing ring in FIG. 1.

According to the detail D shown in FIG. 1A, the securing ring 7 is inserted into a circumferential groove 8 of the shaft 1 near the end face. On the opposite side, the two-leg angled securing ring 7 engages behind the rolling bearing 5 to axially secure the installation position. The securing ring 7 comes into engagement on the outer edge side in an inner radial edge recess 9 of the rolling bearing 5, so that a protruding installation is realized here.

Figure 1B:
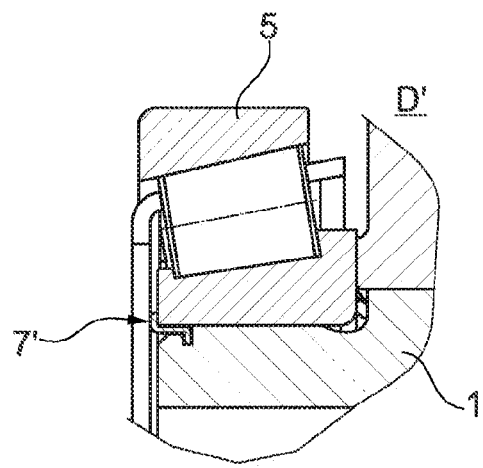
FIG. 1B shows an alternative detail D' in the region of the securing ring of FIG. 1.

According to the alternative detail D' that can be seen in FIG. 1B, such an edge recess is not provided, so that the securing ring 7' causes a slight axial overhang here.

Figure 2:
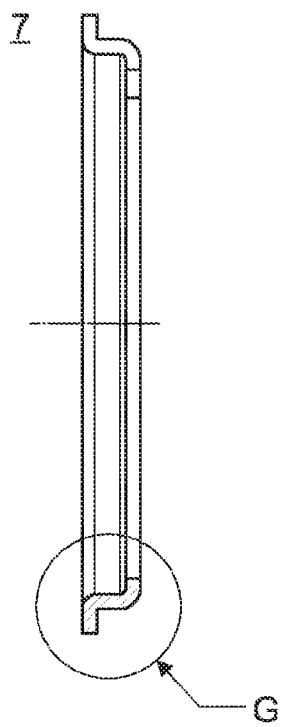
FIG. 2 shows a partially sectioned side view of the securing ring as a single component.
Figure 2A:
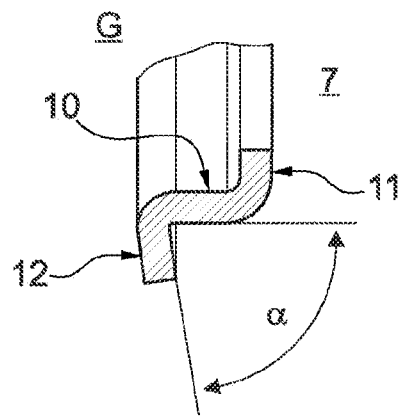
FIG. 2A shows a detailed view G in the region of the profile cross-section of the securing ring from FIG. 2.

In FIG. 2 the securing ring 7 is shown as a single part. With reference to the enlarged detail G of the associated FIG. 2a, the securing ring 7 has, starting from an axially extending central section 10, an installation edge 11 oriented radially inward for engagement in the circumferential groove (not shown) of the shaft. On the other side, the securing ring 7 has a deformation edge 12 that extends radially outwards in the installed state for engaging behind the rolling bearing (also not shown here). This results in the two-leg angled profile, which resembles a Z-profile. In this embodiment, the deformation edge 12 is at an angle $\alpha < 90°$ to the axial central section 10 to avoid movement of the component to be secured in axial securing.

Figure 3:
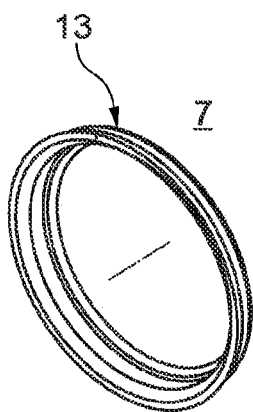
FIG. 3 shows a perspective view of the securing ring according to FIG. 2 as a first exemplary embodiment.

According to FIG. 3, the two-leg profiled securing ring 7 is made from a formed sheet metal strip material and is provided with a separating slot 13 for elastic diameter adjustment for installation.

Figure 4:
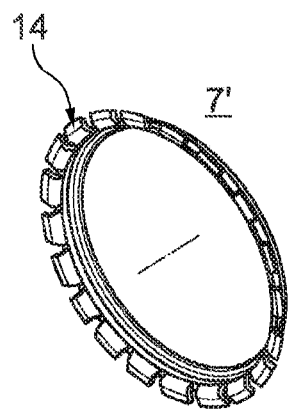
FIG. 4 shows a perspective view of a securing ring of a further exemplary embodiment.

In the alternative embodiment of the securing ring 7' shown in FIG. 4, the deformation edge consists of individual forming tabs 14 (example) which are spaced apart from one another in the circumferential direction and which form an interrupted radial edge region.

The installation of the rolling bearing 5 on the shaft 1 of the gear module using the securing ring 7 takes place in accordance with the following installation steps.

Figure 5A:
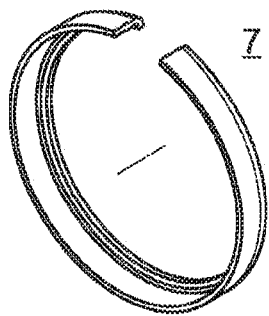
FIG. 5A shows a perspective view of the securing ring before installation.
Figure 5B:
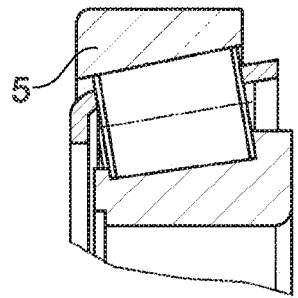
FIG. 5B shows a partial longitudinal section of the rolling bearing-shaft arrangement before installation.

According to FIG. 5A, the securing ring 7 is initially in a relaxed state and is inserted into the circumferential groove 8 of the shaft 1 and pretensioned, as a result of which its diameter is reduced. The rolling bearing 5 is placed in the ready-to-install position.

Figure 6A:
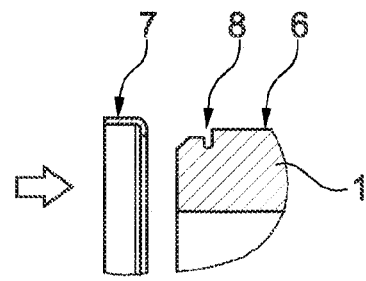
FIG. 6A shows a perspective view of the securing ring during installation.
Figure 6A:
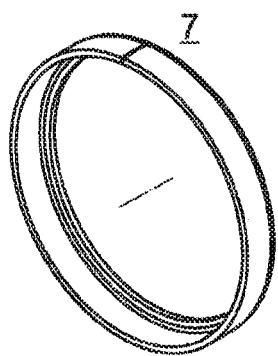
Figure 6B:
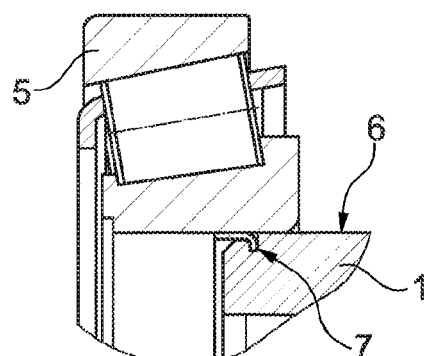
FIG. 6B shows a partial longitudinal section of the rolling bearing-shaft installation during installation.

According to FIGS. 6A and 6B, the rolling bearing 5 is plugged onto the bearing seat section 6 of the shaft 1 via the pretensioned securing ring 7.

Figure 7A:
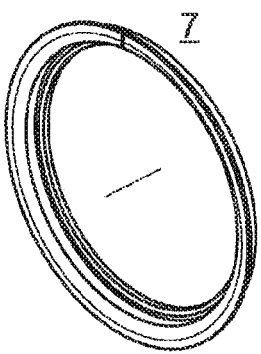
FIG. 7A shows a perspective view of the securing ring after installation.
Figure 7B:
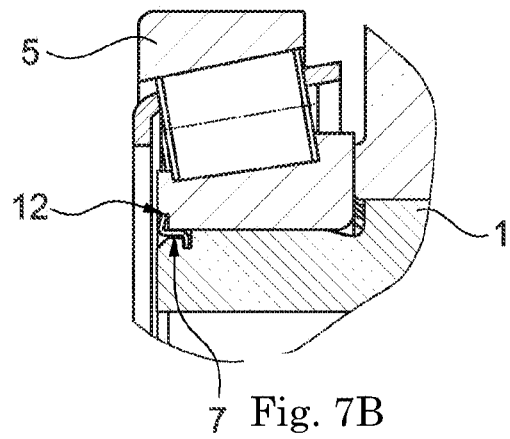
FIG. 7B shows a partial longitudinal section of the rolling bearing-shaft arrangement after installation.

With regard to FIGS. 7A and 7B, the securing ring 7 is finally deformed by bending to form the deformation edge 12 extending radially outwards for engaging behind the mounted rolling bearing 5. This creates a non-detachable axial lock for the axial bearing 5 plugged thereonto and— optionally—for a gear or the like previously plugged in over the end of the shaft.

The disclosure is not restricted to the preferred exemplary embodiments described above. Rather, deviations therefrom are also conceivable that are included within the scope of protection of the following claims. For example, it is also possible to secure a component other than a rolling bearing in the axial installation position on a shaft with the securing ring that is the subject matter according to the disclosure.

LIST OF REFERENCE SYMBOLS

1 Shaft
2 Gear
3 Splined section
4 Helical gearing
5 Rolling bearing
6 Bearing seat section
7 Securing ring
8 Circumferential groove
9 Edge recess
10 Central section
11 Installation edge
12 Deformation edge
13 Separating slot
14 Forming tab
15 Relief groove

The invention claimed is:

1. A gear module for a transmission, the gear module comprising:
at least one gear arranged on a rotatably mounted shaft;
a rolling bearing for rotatable mounting of the shaft, the rolling bearing is plugged onto on an end-face bearing seat section of the shaft; and
a securing ring arranged in a circumferential groove of the shaft near an end face of the shaft in order to axially secure an installation position of the rolling bearing on the shaft, the securing ring has on one side an installation edge oriented radially inwards, starting from an axial central section, for engaging in the circumferential groove of the shaft, and on an other side has a deformation edge that extends radially outwards in an installed state for engaging behind the rolling bearing that is plugged onto the shaft;
wherein the securing ring has a two-leg profile in cross-section, and is made from a formed sheet metal strip material and has a separating slot for elastic diameter adjustment.

2. The gear module according to claim 1, wherein the circumferential groove of the shaft near the end face is arranged within a bore of the rolling bearing when the securing ring is in the installed state.

3. The gear module according to claim 1, wherein the deformation edge of the securing ring in the installed state is accommodated primarily in a region of an inner radial edge recess of the rolling bearing.

4. The gear module according to claim 1, wherein at least one of the deformation edge or the installation edge of the securing ring extends at an angle of less than or equal to 90° with respect to the axial central section.

5. The gear module according to claim 1, wherein the at least one gear comprises a first gear to form a transmission ratio step, and a second gear plugged onto a splined section of the shaft adjacent to the bearing seat section.

6. The gear module according to claim 5, wherein between the second gear plugged onto the splined section and the rolling bearing plugged onto the adjacent bearing seat section with respect to the shaft, a relief groove is provided so that the second gear forms an axial stop for the rolling bearing.

7. The gear module according to claim 5, wherein the second gear plugged onto the splined section is provided with a helical gearing, a course of which presses the second gear against a shaft shoulder as an axial stop during operation.

8. The gear module according to claim 5, wherein the first gear is formed in one piece with the shaft and has a smaller diameter than the second gear.

9. The gear module according to claim 5, wherein a flank side of the first gear facing the second gear forms an axial stop for the second gear plugged onto the splined section of the shaft.

10. A method for mounting the rolling bearing on the shaft of the gear module according to claim 1, comprising steps of: inserting the installation edge of the securing ring into the end-face outer groove of the shaft;
plugging the rolling bearing onto the bearing seat section of the shaft with the securing ring inserted; and deforming the securing ring to form the radially outwardly extending deformation edge for engaging behind the mounted rolling bearing.

11. The method according to claim 10, further comprising before the installation step of inserting the securing ring into the circumferential groove of the shaft, or at least before installation of the rolling bearing, plugging a helical gear onto a splined section of the shaft via the bearing seat section.

12. A gear module for a transmission, the gear module comprising: a gear arranged on a rotatably mounted shaft; a rolling bearing for rotatable mounting of the shaft, the rolling bearing is located on a bearing seat section of the shaft adjacent to an end face of the shaft; a securing ring arranged in a circumferential groove of the shaft that is offset from the end face of the shaft, the securing ring has an axial central section, an installation edge oriented radially inwards that extends from one side of the axial central section and engages in the circumferential groove of the shaft, and a deformation edge that extends radially outwards from an other side of the axial central section that engages behind the rolling bearing on a side thereof facing axially away from the shaft, wherein the securing ring is made from a formed sheet metal strip material and has a separating slot for elastic diameter adjustment.

13. The gear module according to claim 12, wherein the circumferential groove is arranged within a bore of the rolling bearing.

14. The gear module according to claim 12, wherein the deformation edge extends into an inner radial edge recess of the rolling bearing.

15. The gear module according to claim 12, wherein at least one of the deformation edge or the installation edge of the securing ring extends at an angle of less than or equal to 90° with respect to the axial central section.

16. The gear module according to claim 12, wherein the at least one gear comprises a first gear integrally formed with the shaft that forms a transmission ratio step, and a second gear located on a splined section of the shaft adjacent to the bearing seat section.

* * * * *